US008731143B2

(12) United States Patent
Keller et al.

(10) Patent No.: US 8,731,143 B2
(45) Date of Patent: May 20, 2014

(54) METHOD AND APPARATUS FOR ROUTING EMERGENCY CALLS USING INFORMATION OBTAINED FROM MULTIPLE SYSTEMS

(75) Inventors: Matthew C. Keller, Barrington, IL (US); Matthew D. Schreiner, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 121 days.

(21) Appl. No.: 13/247,339

(22) Filed: Sep. 28, 2011

(65) Prior Publication Data

US 2013/0077766 A1  Mar. 28, 2013

(51) Int. Cl.
*H04M 11/04* (2006.01)
(52) U.S. Cl.
USPC .................................................. 379/39
(58) Field of Classification Search
USPC .............................. 379/39, 42, 45
See application file for complete search history.

(56) References Cited

U.S. PATENT DOCUMENTS

| | | | |
|---|---|---|---|
| 5,249,223 A | | 9/1993 | Vanacore |
| 5,311,569 A | * | 5/1994 | Brozovich et al. ............ 379/45 |
| 8,005,937 B2 | * | 8/2011 | Wesley et al. ............ 709/223 |
| 2002/0118796 A1 | * | 8/2002 | Menard et al. ............ 379/45 |
| 2010/0003954 A1 | * | 1/2010 | Greene et al. ............ 455/404.1 |

FOREIGN PATENT DOCUMENTS

WO        9831130 A1    7/1998

OTHER PUBLICATIONS

International Search Report and Written Opinion Dated Nov. 30, 2012 for Counterpart Application PCT/US2012/054580.

* cited by examiner

*Primary Examiner* — Alexander Jamal
(74) *Attorney, Agent, or Firm* — Daniel R. Bestor; Kenneth A. Haas

(57) ABSTRACT

In an emergency response system, a first set of information is used to determine (i) a first set of operator positions to whom an emergency call can be sent and (ii) an identify of a first operator identifier for each operator position in the first set of operator positions based on a set of rules. The first operator identifier for each operator position in the first set of operator positions is mapped with a second operator identifier known to a second system. A subset of the first set of operator positions is determined based on the set of rules using real-time operator information obtained from the second system associated with each of the second operator identifiers. The real-time operator information is different from the first set of information. The emergency call is routed to at least one operator position in the second set of operator positions.

20 Claims, 3 Drawing Sheets

METHOD AND APPARATUS FOR ROUTING EMERGENCY CALLS USING INFORMATION OBTAINED FROM MULTIPLE SYSTEMS

FIELD OF THE DISCLOSURE

The present disclosure relates generally to routing incoming emergency calls and more particularly to using status information obtained from systems other than a primary emergency call handling system used by a call operator in routing an emergency call.

BACKGROUND

A Customer Premise Equipment (CPE) is used to route an incoming emergency call to a specific call taker within a public safety answering point (PSAP). The CPE may be used in, for example, an emergency system such as a 9-1-1 emergency system. In particular, the CPE may include an automatic call distributor (ACD) that implements routing rules to determine to which call taker (also referred to herein as operator position or call operator) an incoming call should be directed. For example, the routing rules can include rules for routing the incoming call away from specific call takers if the specific call takers are currently busy with taking other calls. The routing rules can also include rules for routing, for example, the incoming call to call takers in a round robin fashion, rules for ensuring that incoming calls are answered in the order received, or rules for queuing incoming calls until a call taker is available.

Future emergency systems are expected to define additional routing criteria to be used in the PSAP and in an Emergency Services IP Network (ESInet). The ESInet is an Internet Protocol (IP) network that includes call routing applications for routing calls to an appropriate PSAP based on the routing rules implemented in the ESInet call routing applications. Routing rules implemented in the ESInet call routing applications could include rules for determining, for example, the operating hours of a PSAP. If, for example, the operating hours of the PSAP are between 8:00 am and 5:00 pm, routing rules implemented in the ESInet call routing applications could include rules for routing emergency calls received outside of the PSAP operating hours to a neighboring PSAP. Routing rules implemented in the ESInet call routing applications could also include rules for routing emergency calls based on the language spoken by the caller, the geographic location of the caller, or the type of incident associated with the emergency call.

In order to take advantage of the capabilities of future emergency systems, operators of smaller PSAPs (for example, those PSAPs with fewer call takers than a pre-defined threshold) may want to combine the operating capabilities of several smaller PSAPs to dynamically form a larger, virtual PSAP. This will allow a smaller PSAP to serve, for example, as a backup PSAP for another smaller PSAP when call overflow occurs at the other PSAP. Consider the example where a traffic accident occurs on a highway and many passing motorists call into the emergency response system to report the accident. Today, if the incoming calls are sent to a smaller PSAP with only two call takers, the telephones at the target PSAP will ring until one of the call takers is available to answer each call. With future emergency systems, the incoming calls can be distributed to other PSAPs in the virtual PSAP.

In addition, smaller PSAPs typically combine call taking and dispatching positions (i.e. one resource/call taker serves both roles). Therefore, in these PSAPs, one call taker may be used to dispatch emergency resources to an incident, manage the emergency resources via a computer-aided display (CAD), communicate with the emergency resources via a radio system, and answer other incoming emergency calls. Existing call routing rules implemented in the ACD or in the ESInet call routing applications do not route incoming emergency calls based on status information received from other systems associated with the call taker, for example, based on status information received from a CAD or a radio system used by the call taker. Instead, current ACD and ESInet call routing application algorithms only use information known to the emergency call handling system to implement the routing rules. Therefore, it is possible to route an incoming emergency call to a call taker that may already be busy performing dispatching or other functions associated with ongoing emergency incident(s).

Accordingly, a method is needed for using status information obtained from other systems associated with emergency response management to determine a true availability of a call taker to answer emergency calls and route the emergency calls accordingly.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
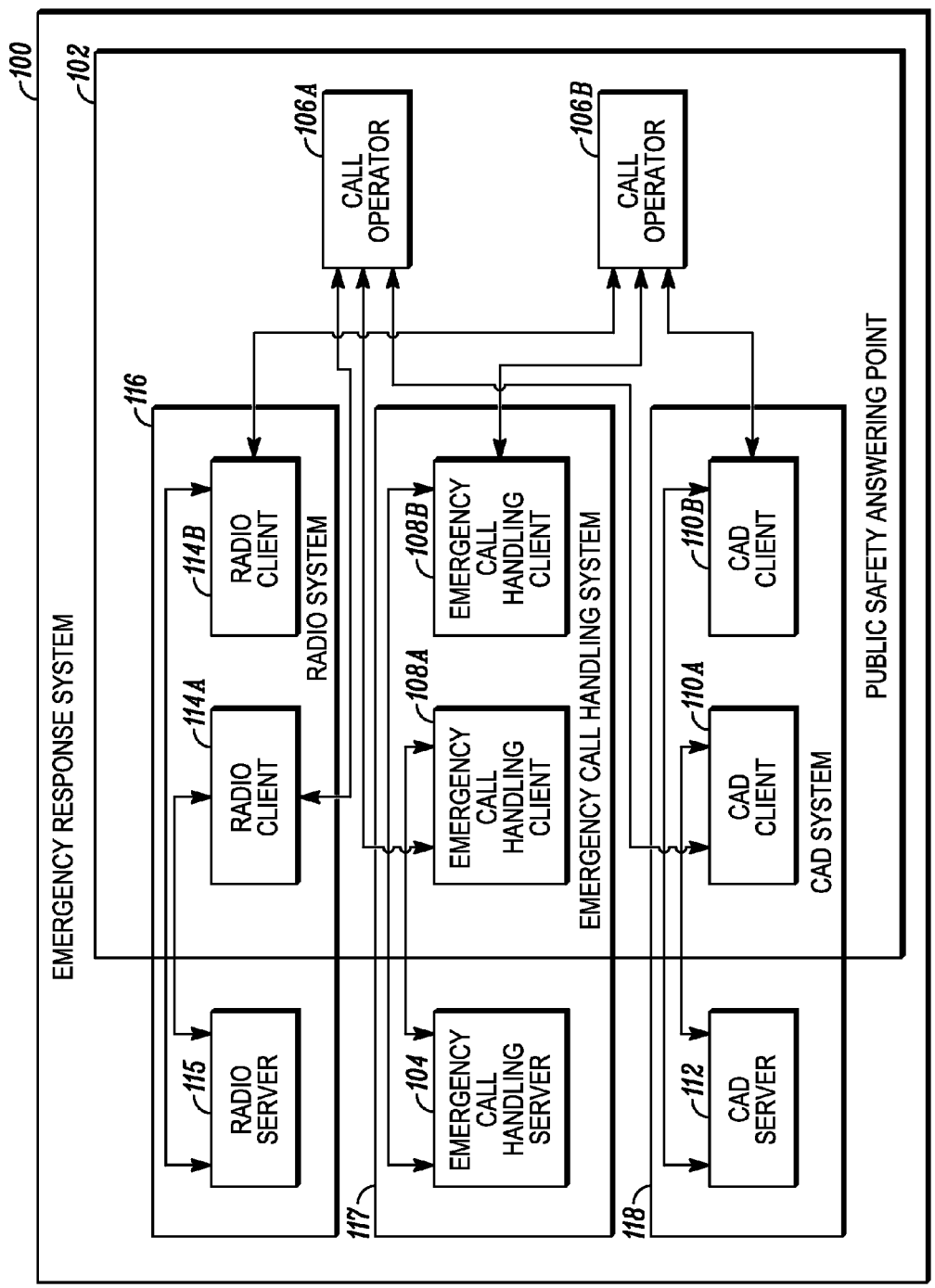
FIG. 1 is a block diagram of an emergency response system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for routing an emergency call to a plurality of operator positions used by emergency call takers. In an emergency response system, a first set of information is used to determine (i) a first set of operator positions to whom an emergency call can be sent and (ii) an identify of a first operator identifier for each operator position in the first set of operator positions based on a set of rules. The first operator identifier for each operator position in the first set of operator positions is mapped with a second operator identifier known to a second system. A subset of the first set of operator positions is determined based on the set of rules using a set of real-time operator information obtained from the second system associated with each of the second operator identifiers. The second set of information is different from the first set of information. The set of real-time operator information may include, for example, a response class for current incidents that are being handled by each operator identified by the second operator identifiers, a response mode of the second system, a role of each operator identified by the second operator identifiers, and the quantity of traffic currently being handled by each operator identified by the second operator identifiers. The emergency call is routed to at least one operator position in the second set of operator positions.

FIG. 1 is a block diagram of an emergency response system used in accordance with some embodiments. Emergency response system 100 maps identities assigned to a call operator from two or more emergency systems and uses status information from the two or more emergency systems and routing rules to route an incoming emergency call to the call operator. In an embodiment, emergency response system 100 may use an easy access code, such as 9-1-1 or 1-1-2, for an incoming emergency call. Emergency response system 100 may automatically associate an originating location with the incoming emergency call. The location may be a physical address or other geographic reference information such as X/Y map coordinates or lattitude/longitude coordinates, for example. A calling party's telephone number may also be used in various ways to derive the originating location.

Emergency response system 100 includes a public safety answering point (PSAP) 102 that is configured to answer incoming emergency calls. Upon receiving the incoming emergency call in PSAP 102, an Emergency Call Handling Server (ECHS) 104, for example a Customer Premise Equipment (CPE) or Next Generation 911 call routing application such as one defined by National Emergency Number Association (NENA) i3 standard, uses status information from two or more systems and routing rules to route the incoming emergency call to the call operator. More particularly, ECHS 104 may include an automatic call distributor (ACD) that implements routing rules to determine the call operator 106a-106b to which the incoming call should be routed.

Each call operator 106a-106b typically uses multiple emergency systems to answer and respond to incoming calls. According to an embodiment, each call operator 106a-106b is assigned an identity in each emergency system. For example, each call operator 106a-106b may use an emergency call handling client 108a-108b that includes telephony related functions for handling currently active emergency calls. Therefore, each call operator 106a-106b is assigned an identity in an emergency call handling system 117. In addition to using an associated emergency call handling client 108a-108b, each call operator 106a-106b may also use clients associated with other systems to answer and respond to emergency calls. For example, upon receiving an incoming emergency call through an associated emergency call handling client 108a-108b, the call operator may also use a radio client 114a-114b to announce details of the emergency call to field units. The call operator may also send text messages with call-for-service details using computer aided dispatch (CAD) clients 110a-110b or via alphanumeric pagers or wireless telephony text services.

In addition, the call operator may use CAD client 110a-110b to dispatch emergency resources, such as police and medical personal, to an emergency incident. For example, call operators 106a-106b may use the CAD client 110a-110b to input call information, dispatch emergency resources, record call status maintenance, enter event notes, record and track the status of field units, and/or document call resolution and disposition. The CAD system 118 includes interfaces (CAD client 110a-110b) that enable call operators 106a-106b to perform dispatching and other functions. The CAD system may also include a CAD server 112 that sends messages to CAD client 110a-110b and/or stores information such as field interviews, client information, and schedules. By using CAD client 110a-110b, call operators 106a-106b in a dispatch center may be able to easily view and understand the status of all resources being dispatched. Therefore, using this example, each call operator 106a-106b is also assigned an identity in each of the radio system 116 and the CAD system 118. The identity for each call operator 106a-106b may be obtained from either the client or server portions of an associated system, for example radio system 116 and the CAD system 118.

In an embodiment, ECHS 104 is configured to implement call routing rules based on information obtained from multiple sources, for example, emergency call handling systems 117, CAD systems 118, and/or radio systems 116. ECHS 104 may implement call routing rules based on real-time operation information obtained for each call operator 106a-106b from the emergency systems. For example, ECHS 104 may obtain information from a call origination system (not shown) that connects to ECHS 104 and provides information about an incoming emergency call. The obtained information may be the precise geographic location of each emergency caller and the language preference of the emergency caller. ECHS 104 may also obtain the hours of operation at PSAP 102, and/or the active response mode at PSAP 102. The active response mode information may be obtained from CAD systems 118 about the entire CAD system and may not necessarily be associated with a particular operator. Nonetheless, the routing rules could determine specific operators to route to or to avoid when the system is in a particular response mode. The active response mode may be, for example, a high response mode during specific events, such as a storm or a parade, or during specific activities, such as fireworks displays on holidays. ECHS 104 may also obtain other types of information from the emergency systems including, for example, each call operator's 106a-106b role. An example of the call operator role may be a primary role or a backup role, wherein a routing rule may be implemented to route incoming calls to a back-up call operator first so that, for example, a primary call operator can manage radio traffic as a primary duty with minimum interruption. ECHS 104 may also retrieve, from radio system 116, information about the quantity of radio traffic in radio system 116 on channels or communication groups actively being used by call operators 106a-106b.

ECHS 104 is configured to use routing rules applied to the obtained information for determining to which call operator 106a-106b the call should be routed. An example of a routing rule implemented by ECHS 104 based on information obtained from an emergency system may be that whenever a call operator has an incident type with a response class of "high-rise", as determined by CAD system 118, the call operator is to be excluded from receiving incoming emergency calls. Another example of a routing rule implemented by ECHS 104 based on information obtained from an emergency system may be that based on a certain time of day, the call operator is to be included in a list of call operators expected to receive incoming emergency calls so that all related call traffic can be routed to that operator. Another example of a routing rule implemented by ECHS 104 based on information obtained from an emergency system may be that based on the call operator role and the response class of the incident being handling by the call operator, the call operator is to be included in a list of call operators expected to receive incoming emergency calls so that all related call traffic can be routed to that operator. Another example of a routing rule implemented by ECHS 104 based on information obtained from emergency systems may be not to route calls to a call operator that is associated with radio traffic above a predefined threshold, where information on the amount of radio traffic for the call operator is obtained from radio system 116.

ECHS 104 determines a first set of call operators to whom an incoming call may be routed using information in ECHS 104 and the routing rules implemented in ECHS 104. Examples of information in ECHS 104 include telephony related information, such as whether each call operator is actively handling other emergency calls, the queue depth or number of active emergency calls each call operator is handling, and/or a busy status for each call operator, i.e., whether a call operator has activated a busy status in order to be excluded from receiving further incoming emergency calls. Different types of status information can also be gathered from the other emergency systems used by call operators 106. Therefore, in addition to using rules and information provided by ECHS 104, ECHS 104 may be further configured to implement call routing rules on the first set of call operators based on information from other emergency systems, such as the CAD system 118 or radio system 116 associated with the first set of call operators. Accordingly, ECHS 104 obtains an identifier for each call operator in the first set of call operators from the emergency systems or, alternatively, ECHS 104 may be configured with an identifier for each call operator in the first set of call operators. ECHS 104 then maps the emergency call handling client 108 identifiers associated with the first set of call operators to call operator identifiers known to other systems, such as the CAD system 118 or radio system 116, where the second call operator identifier is different from the first. ECHS 104 uses routing rules and information from the second emergency system to determine a second set of call operators. The second set of call operators is a subset of the first set of call operators, i.e., the second set of call operators may be the same as the first set of call operators or a sub-portion of the first set of call operators. This allows ECHS 104 to route emergency calls based on information obtained from additional emergency systems being used by call operators 106.

Consider the example where ECHS 104 uses information obtained from several emergency systems that are being used by a call operator, for example call operator 106a, and implements rules for routing a new incoming emergency call. In this example, ECHS 104 uses information obtained from emergency call handling system 117, CAD system 118, and/or radio system 116 associated with call operator 106a to identify the type and number of incidents call operator 106a is handling. For example, ECHS 104 uses information obtained from CAD system 118 and/or radio system 116 associated with call operator 106a to identify the types of incidents (for example, fire, traffic stop or medical emergency) call operator 106a is handling, the priority level associated with each incident, and/or the response class for each incident. A response class may be associated with certain types of incidents at a specific type of location. For example, the response class for a bank robbery or a fire emergency in a high-rise building may be set to "high".

In an embodiment, the information obtained from various emergency systems associated with the call operator can be used alone or in combination in implementing call routing rules. The status information obtained from one or more systems may be stored in a single database or in multiple databases that are accessible to ECHS 104. The instructions for implementing the routing rules may be stored in the same database as status information obtained from one or more systems or they may be stored in separate databases. The routing rules may be implemented as stored program instructions (including both software and firmware) executed by one or more processors in the emergency response system.

Figure 2:
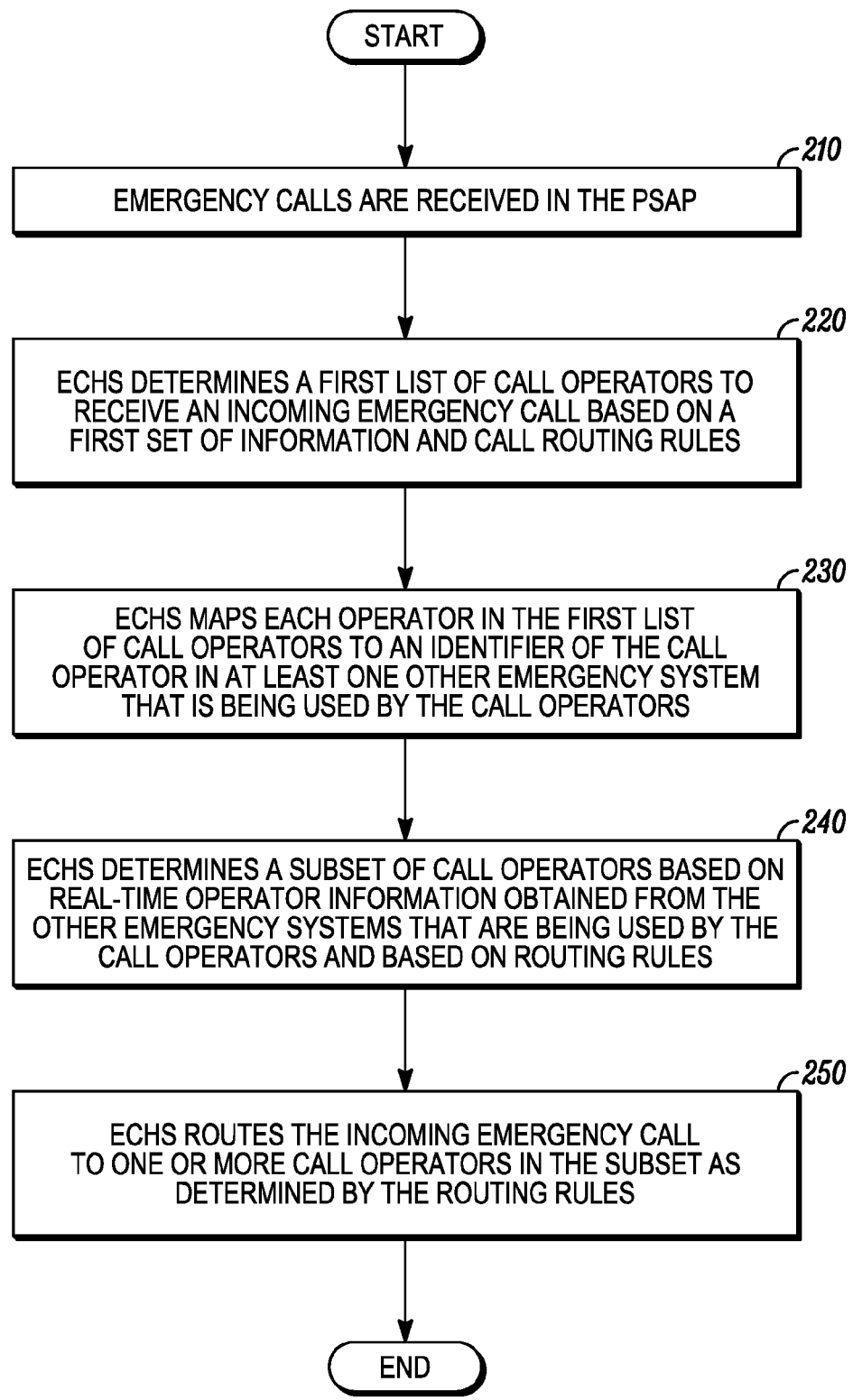
FIG. 2 is a flow diagram of a routing process used in some embodiments.

FIG. 2 is a flow diagram of a routing process that may be used in some embodiments. In 210, emergency calls are received in the PSAP. In 220, the ECHS determines a first list of call operators to receive an incoming emergency call based on a first set of information and call routing rules. For example, the first set of information may be telephony related information, such as which call operators are actively handling other emergency calls and the queue depth of active emergency calls being handled by each call operator. The call routing rules may use the first set of information to include each operator with a queue depth below a predefined threshold in the first list of call operators to receive the incoming emergency call. In 230, the ECHS maps each operator in the first list of call operators to an identifier of the call operator in at least one other emergency system that is being used by the call operators, for example a dispatch operator identifier obtained from the CAD system 118 and/or a radio identifier obtained from the radio system 116. In 240, the ECHS determines a subset of call operators based on real-time operator information obtained from the other emergency systems that are being used by the call operators and based on routing rules. For example, the real-time operator information may include the role of each operator in the other emergency systems. The call routing rules may use the real-time operator information to exclude each operator with a primary role in the other emergency systems from receiving incoming emergency calls. In 250, the ECHS routes the incoming emergency call to one or more call operators in the subset as determined by the routing rules. Using the examples above, the ECHS routes the incoming emergency call to one or more call operators with a queue depth below a predefined threshold and with a backup role in the other emergency systems. By using call status information obtained from other emergency systems, the ECHS is able to determine a set of call operators to which an incoming call should be routed. The order for determining the set of operators based on call operator information and based on real-time operator information obtained from other system(s) can be switched. Although the discussion above is directed to the ECHS determining the set of call operators, this determination can be, partially or entirely separately, performed by other components of the emergency response system 100.

By using information from various emergency systems associated with each call operator, the ECHS is therefore configured to route calls more efficiently. For example, in a virtual PSAP, when a call operator is serving as a backup call taker for another PSAP, an incoming emergency call can be routed to ensure that if the call operator is overloaded with existing emergency call taking functions and dispatch functions, the call operator is not used as the backup call taker. Many other possibilities exist as well.

Figure 3:
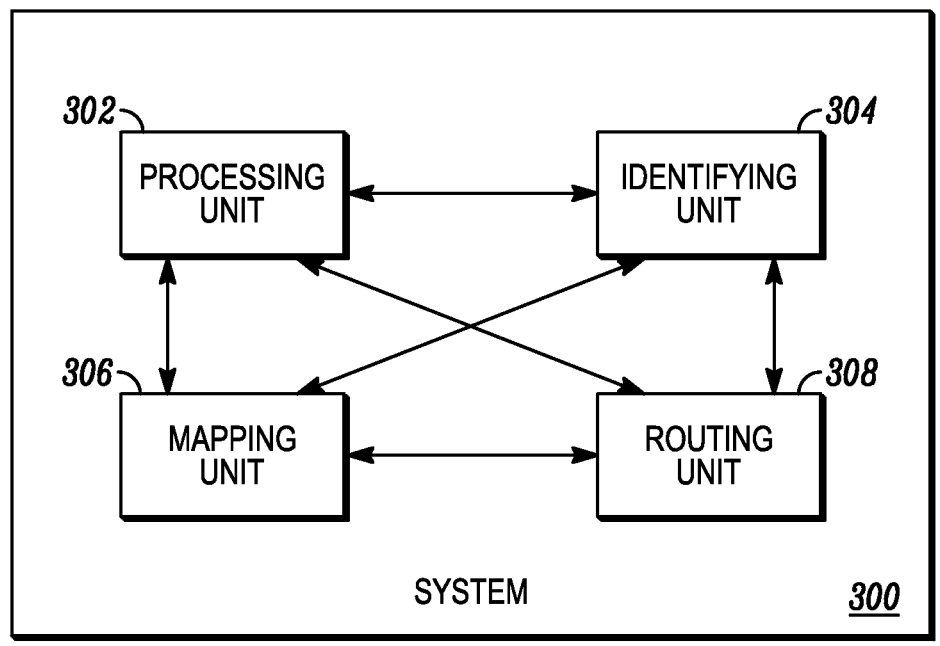
FIG. 3 is another block diagram of an emergency response system used in accordance with some embodiments.

FIG. 3 is a block diagram of an emergency response system for routing an emergency call to one or more operator positions. The emergency response system 300 includes a processing unit 302, an identifying unit 304, a mapping unit 306 and a routing unit 308. Processing unit 302 is configured to process a first set of information to determine a first set of operator positions to whom an emergency can be sent based on routing rules. Identifying unit 304 is configured to identify a first operator identifier for each operator position in the first set of operator positions. Mapping unit 306 is configured to map the first operator identifier for each operator position in the first set of operator positions with a second operator identifier known to a second system. Processing unit 302 is also configured to use real-time operator information obtained from the second system against each of the second operator identifiers to identify a second set of operator positions, as a subset of the first set of operator positions. The second set of information is different from the first set of information. Routing unit 308 is configured to route the emergency call to at least one operator position in the second set of operator positions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of routing an incoming emergency call to a selected one out of a plurality of call operators at a public safety answering point, the method comprising:

using a first set of information, in an emergency call handling system of the public safety answering point, to determine a first set of available call operators to whom the incoming emergency call can be routed to;

identifying, in the emergency call handling system, a first operator identifier for each call operator in the first set of available call operators;

associating, in the emergency call handling system, each first operator identifier for each call operator in the first set of available call operators with a second operator identifier that identifies each respective call operator, from the first set of available call operators, in a second system comprising one of a radio system for call operators to contact first responders and a dispatch system for call operators to dispatch first responders;

obtaining, by the emergency call handling system, a second set of information comprising real-time operator status information in the second system of each call operator in the first set of available operators using the second operator identifiers;

using the second set of information to determine a second set of available call operators to whom the incoming emergency call can be routed to, as a subset of the first set of available call operators, wherein the second set of information is different from the first set of information; and routing, by the emergency call handling system, the incoming emergency call to a particular one of the call operators in the second set of available call operators.

2. The method of claim 1, wherein the first set of information includes one or both of current call status information and queued call status information associated with each of the plurality of call operators.

3. The method of claim 1, wherein the second system is the dispatch system.

4. The method of claim 1, wherein the second system is the radio system.

5. The method of claim 1, further comprising obtaining the first set of information from at least one database maintained by the emergency call handling system.

6. The method of claim 3, further comprising obtaining the second set of information from at least one database associated with the dispatch system.

7. The method of claim 4, further comprising obtaining the second set of information from at least one database associated with the radio system.

8. An emergency call handling system for routing an incoming emergency call to a selected one out of a plurality of call operators at a public safety answering point, the emergency call handling system comprising:
   a processing unit configured to process a first set of information to determine a first set of available call operators to whom the incoming emergency call can be routed to;
   an identifying unit configured to identify a first operator identifier for each call operator in the first set of available call operators;
   a mapping unit configured to associate each first operator identifier for each call operator in the first set of available call operators with a second operator identifier that identifies each respective call operator, from the first set of available call operators, in a second system comprising one of a radio system for call operators to contact first responders and a dispatch system for call operators to dispatch first responders;
   a unit configured to obtain a second set of information comprising real-time operator status information in the second system of each call operator in the first set of available operators using the second operator identifiers, and to use the second set of information to determine a second set of available call operators to whom the incoming emergency call can be routed to, as a subset of the first set of available call operators, wherein the second set of information is different from the first set of information; and
   a routing unit configured to route the incoming emergency call to a particular one of the call operators in the second set of available call operators.

9. The system of claim 8, wherein the first set of information includes one or both of current call status information and queued call status information associated with each of the plurality of call operators.

10. The system of claim 8, wherein the second system is the dispatch system.

11. The system of claim 8, wherein the second system is the radio system.

12. The system of claim 8, further comprising an obtaining unit configured to obtain the first set of information from at least one database maintained by the emergency call handling system.

13. The system of claim 10, further comprising an obtaining unit configured to obtain the second set of information from at least one database associated with the dispatch system.

14. The system of claim 11, further comprising an obtaining unit configured to obtain the second set of information from the radio system.

15. The method of claim 1, wherein the first set of information includes one or both of an operator-initiated busy status and a status of an operator as a backup call taker for a second public safety answering point.

16. The method of claim 3, wherein the second set of information includes at least one of an active incident type associated with a call operator, a call operator role in an active incident, a response class of an active incident associated with a call operator, and a priority level of an active incident associated with a call operator.

17. The method of claim 4, wherein the second set of information includes a quantity of radio traffic on channels or groups associated with a call operator.

18. The system of claim 8, wherein the first set of information includes one or both of an operator-initiated busy status and a status of an operator as a backup call taker for a second public safety answering point.

19. The system of claim 10, wherein the second set of information includes at least one of an active incident type associated with a call operator, a call operator role in an active incident, a response class of an active incident associated with a call operator, and a priority level of an active incident associated with a call operator.

20. The method of claim 11, wherein the second set of information includes a quantity of radio traffic on channels or groups associated with a call operator.

\* \* \* \* \*